United States Patent Office 3,295,725
Patented Jan. 3, 1967

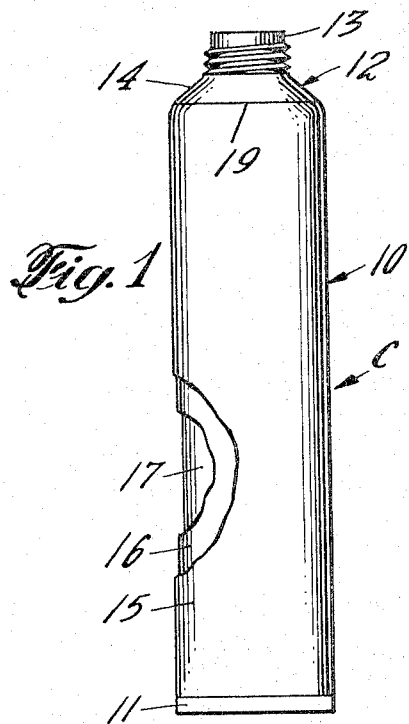
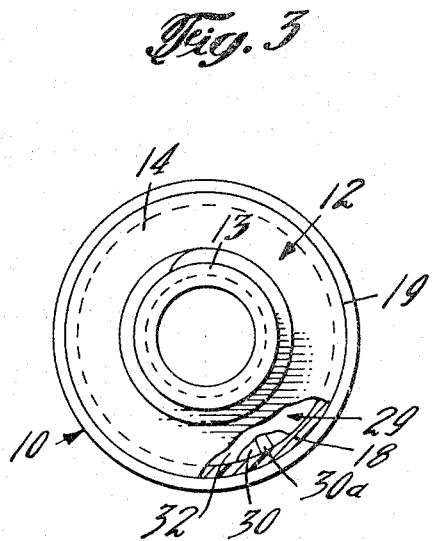
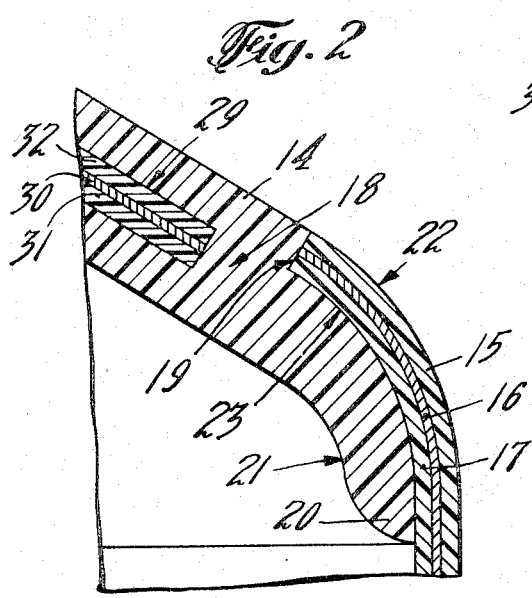
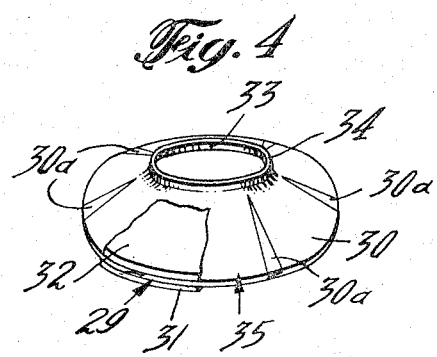

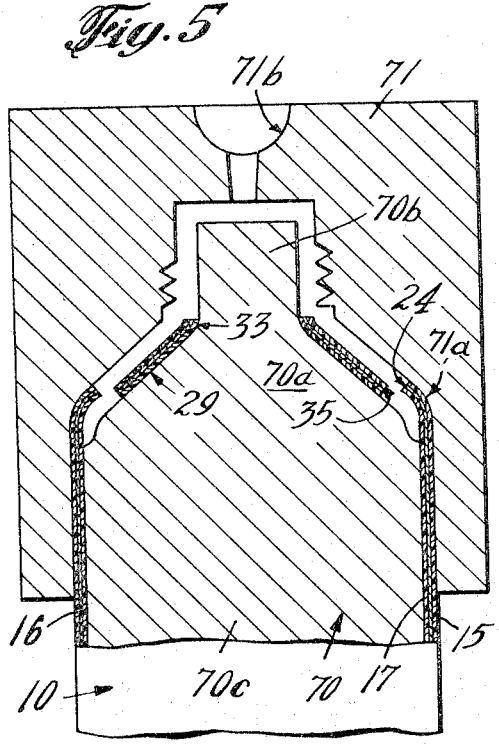
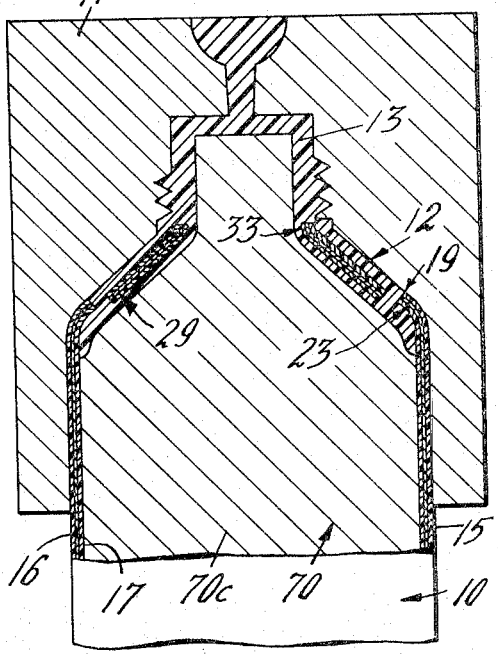
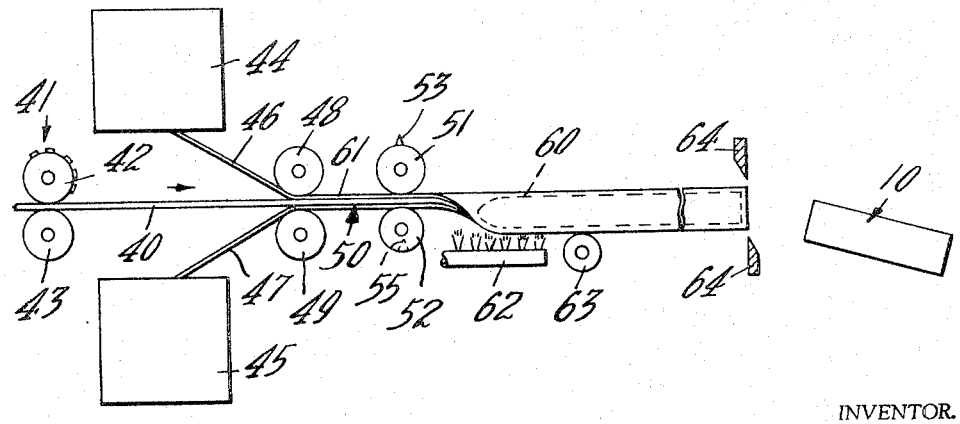
INVENTOR.
ROGER BRANDT
BY
ATTORNEY

3,295,725
COLLAPSIBLE DISPENSING CONTAINER WITH AN IMPERMEABLE BARRIER BOTH IN ITS LAMINATED WALL AND IN ITS HEADPIECE
Roger Brandt, Wayland, Mass., assignor to American Can Company, New York, N.Y., a corporation of New Jersey
Original application Dec. 7, 1962, Ser. No. 242,991, now Patent No. 3,260,777, dated July 12, 1966. Divided and this application Mar. 14, 1966, Ser. No. 550,074
8 Claims. (Cl. 222—107)

This is a division of my copending application Serial No. 242,991, filed December 7, 1962, now Patent No. 3,260,777.

The present invention relates broadly to the container art, and is more particularly concerned with a collapsible dispensing container of laminated wall construction in the body and breast portions thereof, whereby product permeation and oxygen absorption are effectively prevented in all regions of the container structure susceptible thereto.

Collapsible tubes formed of metallic and plastic materials have long been known in the packaging field. Extruded metal tubes, and particularly those constructed of lead, are inherently brittle and repeated use not infrequently results in wall cracks so that product is exuded from a location other than the dispensing orifice. Aluminum tubes, while being less brittle, are somewhat limited in their applications since to date it has not been possible to apply to the interior surfaces thereof a completely satisfactory coating, when required to prevent attack and corrosion of the metal by alkaline or acid contents and contamination of the contents by the reaction products. And notwithstanding the relatively brittle nature of lead tubes, the mentioned internal coating operation requires an additional processing step which necessarily increases the cost of the final article.

Tubes formed of polyethylene and other plastic materials have enjoyed wide commercial success in the packaging of many products, however, certain other products after a time have been noted to deteriorate when contained therein. Plastics as exemplified by polyethylene are permeable to a degree when employed in the wall thicknesses used in tubular containers, and the essential oils embodied in most dentifrices for flavoring purposes are reduced in volume during storage of the container, rendering the dentifrice less palatable. Then too, the plastic container wall absorbs oxygen after a period of time and ultimately may decompose the product, which has actually been found to be the case with fluoride-containing toothpastes.

It has accordingly been proposed to provide a relatively thin metallic barrier between the product and the polyethylene tube body to prevent the mentioned loss of essential oils and the absorption of oxygen. The metallic barrier has been suggested as an interlayer between facing sheets of polyethylene, and that a laminate be formed by heat with or without suitable adhesives. However, while a structure of this general character is effective to prevent product permeation and oxygen absorption through the tube body, and particularly when the inner thermoplastic layer is a copolymer of an olefin and a polar group-containing monomer which is co-polymerizable therewith, there remains the possibility of product deterioration by reason of the absence of a barrier layer in the region of the tube breast. This possibility is especially present when as a matter of material savings or for other reasons the wall thickness of the termoplastic headpiece is reduced.

It is, therefore, an important aim of the present invention to provide a collapsible dispensing container of laminated wall construction in not only the body portion, but also in the breast portion thereof.

Another object of this invention lies in the provision of a tubular container having a plurality of adherent layers in the body and breast portions thereof, one of said layers providing a barrier to product permeation and oxygen absorption and another of said layers being a material selected from the group consisting of a polyolefin and a copolymer of an olefin and a polar group-containing monomer which is copolymerizable therewith.

A further object of the instant invention is to provide a method of producing laminated tubes in which a tubular body is formed of a barrier layer and a thermoplastic layer laminated thereto, the laminated tube body then located on a forming member in adjacency to a barrier member also positioned thereon, and thermoplastic material thereafter bonded to the barrier member and to the thermoplastic layer to form a headpiece on the tube body.

Other objects and advantages of the invention will become more apparent as the description proceeds, particularly when taken in connection with the accompanying drawings.

In the drawings, wherein like numerals are employed to designate like parts throughout the same:

FIGURE 1 is a side elevational view of a collapsible dispensing container embodying the novel concepts of this invention, with portions of the body walls being broken away to more fully illustrate the laminated structure;

FIGURE 2 is an enlarged fragmentary sectional view of the laminated body and breast portions of the instant container;

FIGURE 3 is a top plan view of the container of FIGURE 1, a portion thereof being broken away for purposes of illustrating the juncture between the laminations in the tube breast and body;

FIGURE 4 is a perspective view of an exemplary form of laminated disc for use in the container breast portion;

FIGURES 5 and 6 are sectional views through typical molding apparatus, and showing two steps in the formation of the instant container; and FIGURE 7 is a side elevational view of an illustrative process for forming laminated tube bodies.

Referring now first to FIGURE 1 of the drawings, a container constructed in accordance with the principles of this invention is designated generally therein by the legend C and comprises a collapsible body portion 10 closed at one end by heat sealing or other techniques, as indicated at 11. The tubular body mounts at its opposite end a plastic headpiece 12 shaped to provide a neck portion 13 and breast portion 14 of which the structural features and mode of fabrication will be more fully described hereinafter.

The tubular body portion 10 in the exemplary embodiment illustrated comprises three layers laminated or otherwise bonded one to the other, although as will be noted later, particular applications may permit a reduction in the number of layers to two while other environments may render desirable the use of four or more layers in the laminate. However, as shown, the collapsible body portion includes an outer layer 15 desirably provided by a thermoplastic material such as a polyolefin, although a cellulosic material such as paper can be used in certain instances and of course in this event the laminating and tube forming techniques would be suitably modified in a manner which will be later set forth. Preferably though, the outer protective medium is a polyolefin illustratively taking the form of polyethylene, but it will be appreciated that the layer 15 may have the same composition as inner layer 17 laminated to the opposite surface of intermediate layer 16.

The interlayer 16, which provides the barrier protection against oxygen absorption from atmosphere and essential oil permeation outwardly through the tube body, is a metallic foil having a thickness sufficient to impart the requisite barrier properties and yet is maintained relatively thin in the interests of cost and pliability of the container during use. Aluminum foil has been found suitable, and the intermediate layer 16 may have printing or ornamental indicia applied thereto on its outer surface, as will be noted in connection with a description of FIGURE 7. In this event, the outer layer will be transparent to permit the indicia to be seen. The layer 15 thus protects the indicia, and by providing the ornamentation or printing on the interlayer, treatment of the outer layer to render it more receptive to inks is eliminated.

The composition of the inner layer 17 may also be varied and one of the polyolefins may provide satisfactory results in certain applications. However, to date it has been found important in attainment of a bond with the foil layer 16 which will not delaminate upon direct exposure to certain products, particularly those of a highly acidic nature and which may be exemplified in the present instance by fluoride-containing toothpastes, that the thermoplastic layer 17 be provided by a copolymer of an olefin and a polar group-containing monomer which is copolymerizable therewith. Or, as may otherwise be stated, the layer 17 desirably is a copolymer of an olefin and an ethylenically unsaturated carboxylic acid.

Preferably, the copolymer is of the random type and has a carboxylic acid content from about 0.5 to about 20 percent by weight, based on copolymer weight. The melt index of the copolymer is between 1 and 50. Quite clearly, many copolymers fall within the above definition, and an especially well-suited compound is provided when the olefin is ethylene and the acid is an ethylenically unsaturated monocarboxylic acid such as acrylic or alkacrylic acid, the former being more desirable at present.

Particularly satisfactory results have been obtained when the inner layer 17 of the laminated body portion 10 is a thermoplastic resin which is a random copolymer of ethylene and acrylic acid made according to the known high pressure process for making low density polyethylene. This specific copolymer has a copolymerized acrylic acid content in the neighborhood of 3 plus or minus 0.5, by weight based on copolymer weight, and a melt index of 8, plus or minus 1.

The innermost layer 17 when constituted of the above copolymer avoids the earlier mentioned problem of delamination from the metallic substrate 16 when exposed to fluoride-containing dentifrices, imparts to the tubular container C excellent stress crack resistance, and provides a highly adherent bond with the headpiece 12, the structural details of which appear in FIGURES 1 to 4. As is shown, the headpiece is formed with a substantially cylindrical skirt portion 20 and a peripheral inwardly curved portion 21 merging into the sloping breast portion 14 which mounts the upstanding passaged neck portion 13, shown as externally threaded to receive an internally threaded closure (not shown).

The skirt portion 20 has substantially the same diameter as the inner diameter of the tube body 10 and is disposed therewithin with the upper end 22 of the body 10 curved inwardly to overlie the inwardly curved portion 21 of the headpiece 12. The inner thermoplastic layer 17 of the tube bond 10 is fused to the skirt portion 20 and curved portion 21 of the head to form an exceptionally strong, head joint 23. The continuous peripheral and vertical fused areas of the joint 23 result in a strong attachment of the headpiece 12 to the tube body 10 with a high resistance to separation by either axial, radial or twisting forces, or combinations thereof. Preferably, the upper end of the tube body 10 is recessed into the head 12, assuring that the metallic interlayer 16 is not exposed along the marginal edge thereof, and the outer layer 15 of the body is welded at its edge 24 to the material of the head so that the outer surface of the joint 23 is a smooth substantially uninterrupted surface. As was stated, the thermoplastic of the head may be low or high density polyethylene, or a different polyolefin, or it could be the same copolymer as forms the inner layer 17, or any one of a number of different thermoplastics which are readily moldable and bound well to the resin of the inner layer 17.

In the conventional laminated tube structure the upper end of the body portion thereof normally terminates at the location shown in FIGURE 2, which is generally along shoulder portion 19 of the tube body 10 defining the lower terminus of the breast portion 14. There accordingly exists in the breast area the possibility that there will be encountered the same problems which exist when the body portion 10 is constituted solely of polyethylene, namely, product permeation and oxygen absorption. This condition is of course most likely to occur when the headpiece is reduced in wall thickness to less than that shown for aesthetic, materials savings, or other reasons.

However, in accordance with the novel concepts of this invention the mentioned difficulty of the prior art construction is obviated by provision of a breast portion containing therein a barrier member 30 which extends from the lower end of the tube neck portion 13 to a point closely spaced from marginal edge portion 24 of the laminated body 10. The barrier member 30 is preferably constituted of a metallic foil, such as aluminum, and may be embedded by itself in the thermoplastic of the breast portion 14 during the molding thereof, although currently the more desirable construction takes the form of a laminated disc member 29 comprised of a metallic foil interlayer 30 and facing thermoplastic layers 31 and 32.

As appears in FIGURE 4, the laminated disc member 29 may be centrally apertured as at 33, for a purpose which presently will be manifest, and may include a relatively short length upstanding collar portion 34 from which flares outwardly and downwardly a skirt portion 35. The disc member 29 is a prefabricated structure, and prior to assembly and lamination of the metallic interlayer 30 and thermoplastic outer layers 31 and 32, the metallic foil barrier 30 may be creased as at 30a along circumferentially spaced line to take up the excess material therein. Of course, in substitution for the pleats or folds 30a the foil disc 30 could be slit.

Prior to describing a preferred technique for molding the disc member 29 into the thermoplastic material of the headpiece 12, it is desired to make reference to FIGURE 7 in connection with an illustrative process for making the laminated tube body 10. A continuous web 40 of foil material may first be passed through a printing unit 41 if it is desired to provide preprinted tube bodies in contrast with later applying suitable indicia to the outer thermoplastic layer 15. The printing unit 41 applies indicia on the upper surface of the web or foil strip 40, and a single printing roll is illustrated at 42 in backup relation with a roll 43. Of course, multiple rolls may be used in those instances where a multicolor design is desired.

The continuous foil layer 40 is preferably preheated and then passes between upper and lower plastic extrusion devices 44 and 45 from which plastic webs or strips 46 and 47 are continuously extruded. The plastic webs 46 and 47 are brought into contact with the upper and lower surfaces of the base material 40 and laminated thereto by driven pressure rolls 48 and 49 to form a laminated web structure 50. Desirably the rate of extrusion of the thermoplastic webs 46 and 57 is less than the linear velocity of the foil base 40 and rolls 48 and 49 so that the extruded plastic webs are drawn down and thinned in the conventional manner prior to being laminated to the base material.

In the technique illustrated in FIGURE 7, the thermoplastic and foil webs are coextensive in width, although if desired the intermediate foil layer may be of lesser width than the facing thermoplastic strips. By so proceeding, an additional plastic extends beyond the longitudinal side edges of the foil and can be utilized during the later side-seaming operation.

The laminated web 50 next passes between a pair of driven rolls 51 and 52, the former roll having a plurality of cutting knives 53 mounted on the surface thereof along a line parallel to its axis of rotation and registrable with and receivable in a similarly positioned series of grooves 55 on the surface of the roll 52. The action of the knives is to periodically produce a series of slits (not shown) in the laminated web 50 along a line transverse to its longitudinal axis. The circumferential dimension of the rolls 51 and 52 is equal to the desired length of the tube bodies 10, so that the slits are produced in the laminated web at longitudinally spaced intervals equal to the desired length of the tube bodies. It can be appreciated, however, that provision of the slits is not at all times required, and that by suitably indexing the later to be described severing means, tube bodies of uniform lengths can be produced.

The edges of the laminated web 50 are then directed downwardly around a cylindrical mandrel 60 to form the web into a tubular configuration with the opposite longitudinal margins 61 of the laminated web in overlapping relation. The overlapped margins are then heated by suitable means, such as a tape sealer or gas heater 62, and then compressed between the mandrel 60 and a pressure roller 63 to fuse the thermoplastic layers thereby fusing and sealing the seam.

After the side seam is formed in the continuous tube, the tube is severed along the lines formed by the now circumferentially disposed slits to produce the tube bodies 10 of the desired length. As appears in FIGURE 7, a pair of oscillatable shear blades 64 are employed for the severing operation.

The tube bodies 10 as thus produced are then ready for the heading operation, including the provision of barrier means 30 in the breast portion 14, and a highly successful technique for forming the headpiece 12 and fusing it to the upper end of the tube body to provide the joint 23 of FIGURE 2 is illustrated in FIGURES 5 and 6. The annular disc member 29, or solely the metallic foil portion 30 thereof, is seated upon shoulder portion 70a of mandrel 70 of an injection molding device with the disc member in encircling relation with neck portion 70b of the mandrel. The tube body 10 is then located upon body portion 70c of the mandrel with the end 22 of the tube body extending into and abutting an inwardly curved surface 71a of a female mold member 71. The curved surface 71a of the mold member forms and bends the end 22 of the tube body 10.

It is important to observe at this point that the marginal edge of the disc member skirt portion 35 is spaced from the marginal edge 19 of the tube body as the laminates 10 and 29 are positioned on the mandrel 70. This provides a flow path for heated thermoplastic material during the injection process, assuring that a firm weld will be formed between the headpiece material and the upper end of the inner thermoplastic layer 17 of the tube body 10, and providing in the final article of FIGURE 2 a strong laminate joint indicated therein at 18 bridging the opposed marginal edges of the laminates 10 and 29.

With the parts positioned as shown in FIGURE 5, the heated thermoplastic material is introduced into passage 71b of the female mold member 71 and under the pressures employed has the effect of lifting the disc member 29 from the mandrel shoulder portion 70a, so that during formation of the headpiece 12 and the welding thereof to the thermoplastic layers 15 and 17 of the tube body 10, the disc member is substantially centered in the thickness of the thermoplastic material providing the breast portion 14. There results from the process described not only a joint 23 between the head material and thermoplastic layer 17 which is highly resistant to fracture, but a breast portion 14 which complements the laminated tube body 10 in being possessed of the important feature of resisting product permeation and oxygen absorption.

While by the technique described in connection with FIGURES 5 and 6 the headpiece 12 is formed and fused to the tube body 10 in a single operation, and an overlap provided between the lower end of the headpiece and the upper end of the tube body using an injection molding process, obviously like results can be achieved using equivalent molding processes. As for example, compression molding can be employed, or a body of thermoplastic material containing a metallic foil interlayer and having the requisite diameter and thickness can be blanked from a web and compacted to the desired head configuration by male and female mold members, while essentially simultaneously forming the shoulder overlap bond. In addition, the headpiece could be formed in a separate operation and thereafter attached to the tube body by heat sealing.

The preferred approach at present is, however, that shown in FIGURES 5 and 6 and there is obtained as a result a fused connection which has a great resistance to fracture or separation by either axial, radial or twisting forces, or combinations thereof. The material forming the inner thermoplastic body layer 17, whether it be a polyolefin or the mentioned copolymer, bonds well to the head material, although the copolymer has the advantages of being highly resistive to delamination in the presence of certain products, and as well, has improved stress crack resistance.

It is believed manifest from the foregoing that applicant has provided a collapsible container structure which completely avoids the problems heretofore unsolved by the prior art. The laminated headpiece completely eliminates product permeation and oxygen absorption, and this highly desirable result is achieved by the use of low cost materials which preferably are combined into laminated form in the manner indicated in FIGURES 2 and 4. As is also apparent, the laminated insert 29 is readily introduced into the heading process shown in FIGURES 5 and 6, although it is also clearly susceptible to use in other methods for forming the head member.

The outer layer 15 of the laminated tube body can be any one of a number of different thermoplastics capable of fusion during the side seaming step and granting adequate protection to the metallic foil interlayer 16. However, the outer layer 15 can be eliminated if the foil barrier is of sufficient thickness to resist damage, and by flowing a thermoplastic material into the overlap side seam during the sealing thereof.

Further, the outer layer may be paper in a three-ply laminate formed of paper, foil and a polyolefin or the copolymer described. A suitable adhesive would of course be used during the side seaming operation. Also, the invention contemplates four-ply laminates comprised of, from outside to in, polyolefin, paper, foil and copolymer, or, polyolefin, foil, paper and copolymer. Like structures can be employed for the headpiece, and where required compatible adhesives would naturally be employed. Additionally, it is within the contemplation of this invention that the thermoplastic material used for molding the headpiece may be of the same composition as the copolymer used for the inner layer 17, and the same copolymer can be used for the layers 31 and 32 of the laminated disc insert 29.

Various modifications of the invention have been disclosed herein, and these and other changes can of course be effected without departing from the novel concepts of the instant contribution.

I claim:
1. A collapsible dispensing container, comprising a deformable body portion having a plurality of laminations therein, one of said laminations being a thermoplastic material and another of said laminations providing a barrier against fluid permeation therethrough, and a thermoplastic headpiece including integral skirt and breast portions, said skirt portion being fused to said one lamination along a band area at one end thereof and said breast portion having barrier means embedded therein.

2. A collapsible dispensing container of the character defined in claim 1, in which the barrier lamination and barrier means are spaced from one another along their marginal end portions.

3. A collapsible dispensing container of the character defined in claim 1, in which the barrier lamination and barrier means are metallic foils.

4. A collapsible dispensing container, comprising a deformable body portion having a plurality of laminations therein, one of said laminations being a thermoplastic material and another of said laminations providing a barrier against fluid permeation therethrough, and a thermoplastic headpiece including integral skirt and breast portions, said skirt portion being fused to said one lamination along a band area at one end thereof and said breast portion hving embedded therein a laminated insert comprised of a barrier interlayer and opposed thermoplastic layers.

5. A collapsible dispensing container, comprising a deformable body portion having a plurality of laminations therein, one of said laminations being a thermoplastic material and another of said laminations providing a barrier against fluid permeation therethrough, and a thermoplastic headpiece including integral skirt and breast portions, said skirt portion being fused to said one lamination along a band area at one end thereof and said breast portion having embedded therein an annular laminated insert axially spaced from the marginal edge portion of said body portion and being comprised of a barrier interlayer and opposed thermoplastic layers.

6. A collapsible dispensing container, comprising a deformable body portion having a plurality of laminations therein, one of said laminations being a thermoplastic material and another of said laminations providing a barrier against fluid permeation therethrough, and a thermoplastic headpiece including integral skirt and breast portions, said skirt portion being fused to said one lamination along a band area at one end thereof and said breast portion having barrier means embedded therein generally centrally of the thickness of said breast portion.

7. A collapsible dispensing container, comprising a deformable body portion having a plurality of laminations therein, one of said laminations being a thermoplastic material and another of said laminations providing a barrier against fluid permeation therethrough, and a thermoplastic headpiece including integral neck, breast and skirt portions, said skirt portion being fused to said one lamination along a band area at one end thereof and said breast portion having barrier means embedded therein located intermediate the opposed ends of said neck and skirt portions.

8. A collapsible dispensing container, comprising a deformable body portion having a plurality of laminations therein, one of said laminations being a thermoplastic material selected from the group consisting of a polyolefin and a copolymer of an olefin and a polar group-containing monomer copolymerizable therewith and another of said laminations providing a barrier against fluid permeation therethrough, and a thermoplastic headpiece including integral skirt and breast portions, said skirt portion being fused to said one lamination along a band area at one end thereof and said breast portion having barrier means embedded therein.

References Cited by the Examiner

UNITED STATES PATENTS

| | | | |
|---|---|---|---|
| 1,322,426 | 11/1919 | Gearhart | 222—107 |
| 2,274,258 | 2/1942 | Roselle | 222—107 |
| 2,605,018 | 7/1952 | Croce et al. | 222—107 |
| 2,713,369 | 7/1955 | Strahm | 150—0.5 |
| 3,172,571 | 3/1965 | Marchak | 222—107 |

RAPHAEL M. LUPO, *Primary Examiner.*